(No Model.) 3 Sheets—Sheet 3.

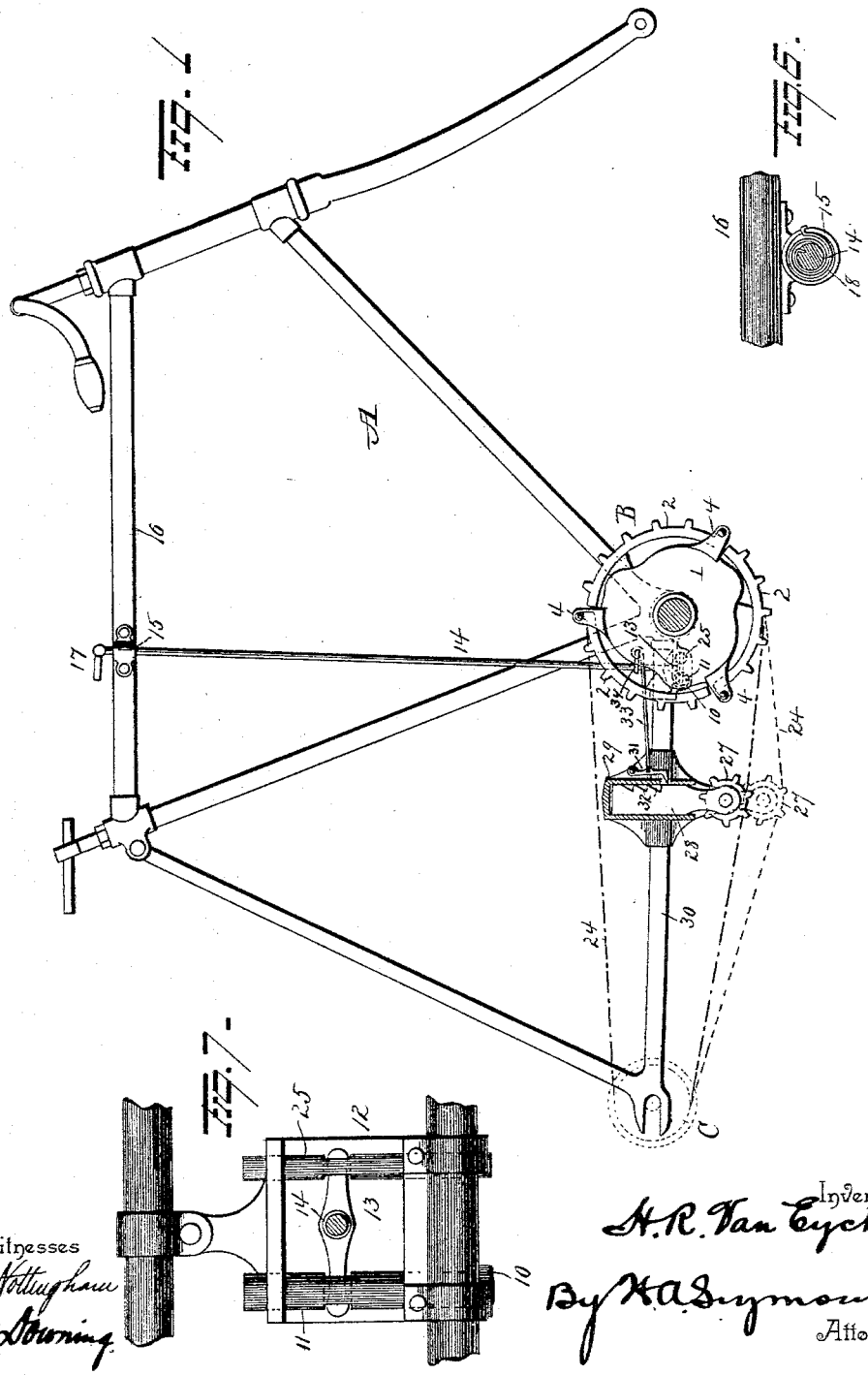

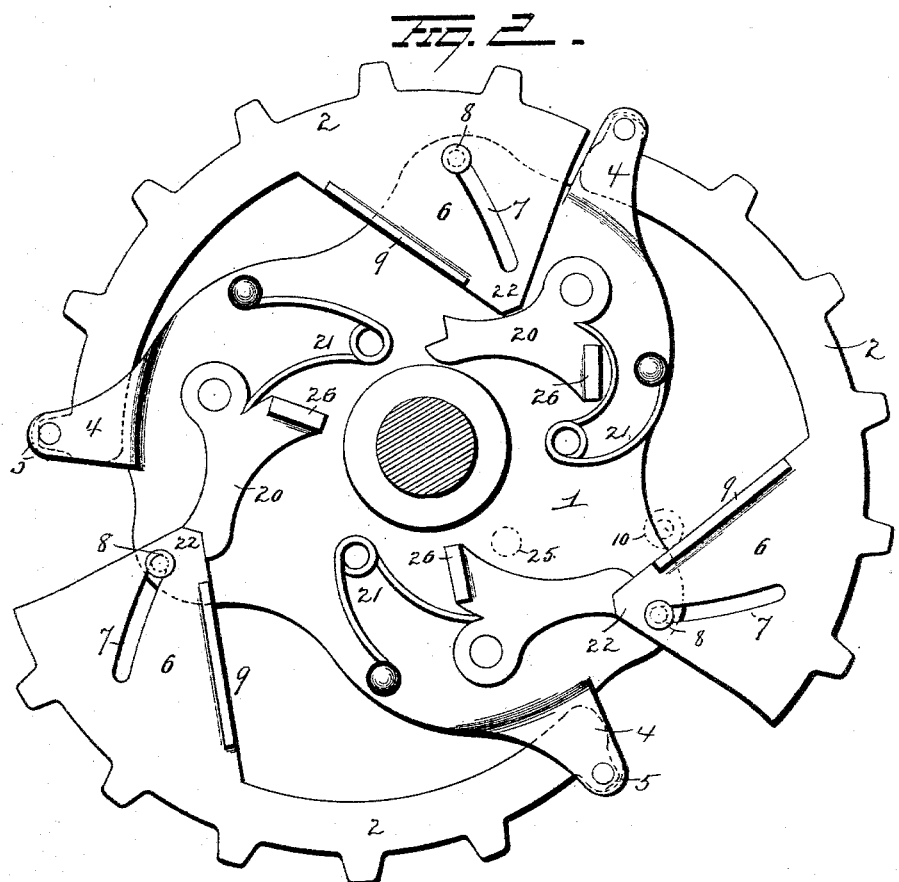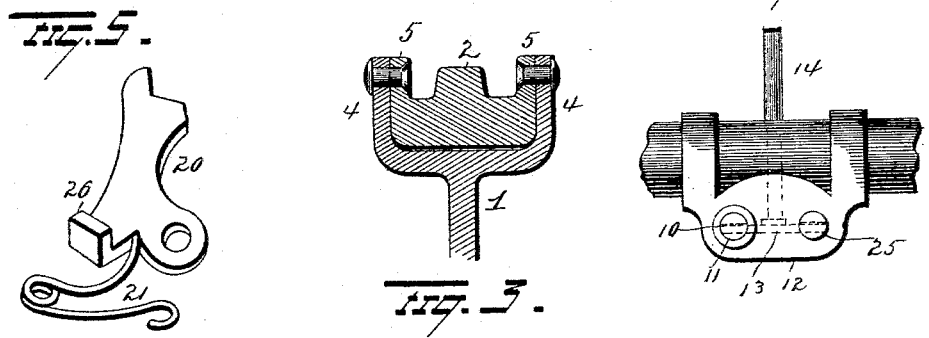

H. R. VAN EYCK.
SPEED CHANGING APPLIANCE.

No. 593,285. Patented Nov. 9, 1897.

Witnesses
E. J. Nottingham
G. F. Downing

Inventor
H. R. Van Eyck
By H. A. Seymour
Attorney

THE NORRIS PETERS CO., PHOTO-LITHO., WASHINGTON, D. C.

UNITED STATES PATENT OFFICE.

HENRY R. VAN EYCK, OF ZEELAND, MICHIGAN.

SPEED-CHANGING APPLIANCE.

SPECIFICATION forming part of Letters Patent No. 593,285, dated November 9, 1897.

Application filed April 8, 1896. Serial No. 586,753. (No model.)

*To all whom it may concern:*

Be it known that I, HENRY R. VAN EYCK, a resident of Zeeland, in the county of Ottawa and State of Michigan, have invented certain new and useful Improvements in Speed-Changing Appliances; and I do hereby declare the following to be a full, clear, and exact description of the invention, such as will enable others skilled in the art to which it appertains to make and use the same.

My invention relates to an improvement in speed-changing appliances, the object of the invention being to provide means whereby to change the speed of machinery quickly, accurately, and effectually.

A further object is to provide speed-changing devices which shall be adaptable for use on bicycles without materially increasing the weight of the latter and which can be easily and quickly operated by the rider while the machine is in motion.

A further object is to so construct the driving sprocket-wheel of a bicycle or other machine that it can be easily and quickly enlarged or reduced in size by means of a device located within reach of the rider.

A further object is to provide speed-changing appliances without the use of a multiplicity of gear-wheels and clutches.

A further object is to so construct speed-changing appliances that the speed of the bicycle can be changed or adjusted for different conditions of the road, which shall be simple in construction, not liable to get out of order, and which shall be effectual in all respects in the performance of their functions.

With these objects in view the invention consists in certain novel features of construction and combinations and arrangements of parts, as hereinafter set forth, and pointed out in the claims.

Figure 8:
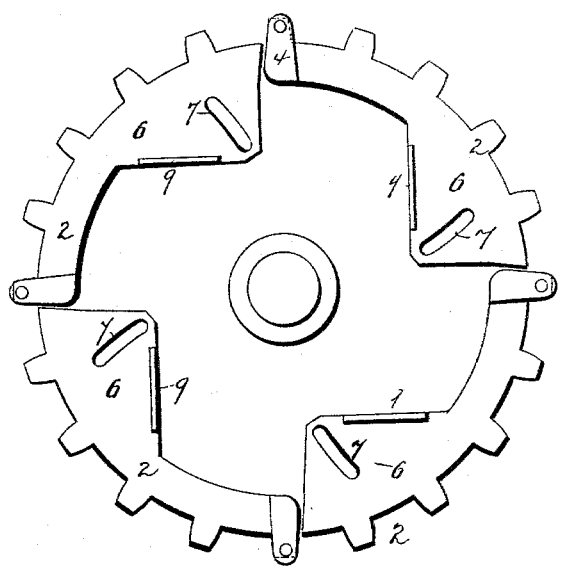
Figure 9:
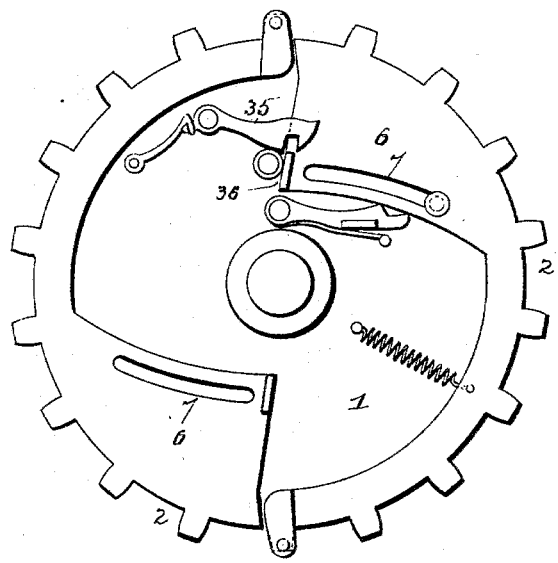

In the accompanying drawings, Figure 1 is a view of a portion of a bicycle, showing the application of my improvements thereto. Fig. 2 is an enlarged view of my improved expansible sprocket-wheel. Figs. 3, 4, 5, 6, and 7 are detail views. Figs. 8 and 9 are views showing modifications.

A represents a bicycle-frame, B the driving sprocket-wheel, and C the sprocket-wheel of the rear wheel of the machine. The driving sprocket-wheel comprises a series of movable sections, and in Fig. 2 a wheel having three of such sections is shown. In constructing this driving sprocket-wheel a disk 1, preferably having a triangular form, is employed, and to the end of each projecting portion of the disk one end of a section 2 of the sprocket-wheel is pivotally connected. In order that the several sections 2 shall properly aline with each other, I prefer to attach them to the disk in the manner shown in detail in Fig. 3—that is to say, each projecting portion of the disk 1 is bifurcated or made with two arms 4 4, between which the end of a section 2 of the wheel is disposed, said end of the section being made with lugs or arms 5, adapted to lie normally parallel with the arms 4 and having the end of the sprocket-section between them. The arms 4 5 are perforated for the reception of pins whereby to pivotally connect the section 2 with the disk or body portion 1 of the wheel. By thus connecting the sprocketed sections 2 with the disk or body portion 1 not only the alinement of the sprockets regardless of the positions of the sections 2 will be insured, but the sprocket-teeth at the pivoted ends of the sections can be the same size as the other sprocket-teeth thereon.

The free end of each sprocketed section 2 is provided with an inwardly-projecting flange or plate 6, which normally lies parallel with the face of the disk or body portion 1 of the wheel, and each flange or plate 6 is made with an elongated slightly-curved slot 7, through which a pin or screw 8, secured to the disk 1, projects, whereby to properly guide said sprocketed sections in their movements, and also to limit their movements. One edge of each flange or plate 6 is provided with a comparatively narrow lateral flange 9, adapted to be engaged by a roller 10 at one end of a bar 11. The bar 11 is mounted to have an endwise-sliding movement in a bracket 12, attached to the frame of the machine, and said bar is notched for the reception of one end of a cross-head 13, secured to the lower end of an operating rod or shaft 14, the lower portion of which latter will preferably have a bearing in the bracket 12, and the upper end passes through a bracket 15, secured to the top horizontal bar 16 of the bicycle-frame. The upper end of the rod or shaft 14 is provided with a handle 17, by means of which to turn it, and the bracket 15 is made with a recess for the reception of a spring 18, attached to the rod or shaft and the bracket, respectively, whereby to retain said rod or shaft and the cross-head at the lower end thereof in their normal positions, so that the roller at the end of the bar 11 will be normally out of the path of the flanges 9 on the plates 6 of the sprocketed sections 2.

Assuming now that the sections of the sprocket-wheel are adjusted for a fifty-four gear and it is desired to use a sixty-three gear, the operator will turn the vertical shaft 14 so as to cause the roller 10 on bar 11 to be projected within the path of the lateral flanges 9 on the plates 6 of the sprocketed sections at a point where the chain is not in contact with the wheel. As the wheel continues to rotate the flanges 9 will successively strike the roller on bar 11 while the sprocketed sections are traveling through the space intervening between the upper and lower leads of the sprocket-chain, and said sprocketed sections 2 will thus be made to turn on their pivotal connections with the disk or body portion 1, so as to cause the wheel to be enlarged. Each section 2 will be forced outwardly a distance limited by the pin 8 in slot 7 of plate 6, which distance exactly corresponds to the distance between two teeth or a multiple thereof, and when the free end of a section 2 reaches the outer end of its movement the lateral flange 9 will ride off of the roller 10. In Fig. 2 I have shown two of the sections 2 projected outwardly to their full extent and the other section at the inner end of its movement.

When the sections shall have been moved outwardly, as above explained, to increase the size of the driving sprocket-wheel, the vertical shaft 14 will be made to assume its normal position and the roller 10 moved out of the path of the lateral flanges 9 by means of the spring 18, the handle at the upper end of the vertical shaft having been released by the rider. Before the operating-shaft 14 is released, however, a series of dogs or latches 20 will be caused, by means of springs 21, to engage the inner ends 22 of the plates 6, whereby to lock the sections 2 in their outward or expanded positions, although the distance between the adjacent ends of two sections of the wheel corresponds to one link and the three sections when expanded make a difference of three links. Nevertheless this is not essential, and multiples of these numbers for larger wheels would, of course, be necessary.

Should it now be desired to change the size of the sprocket-wheel for a smaller gear—say back to a fifty-four gear—the dogs or latches 20 must be moved out of engagement with the plates or flanges 6 of the sprocketed sections 2, and when this is done the sections will be made to assume their normal positions to form a smaller wheel by the tension of the drive-chain 24.

To accomplish the release of the sprocketed sections by the manipulation of the handle at the upper end of the shaft 14, the devices now to be described will be employed. A bar 25, similar to the bar 11, but preferably of smaller diameter, is mounted in the bracket 12 parallel with said bar 11 and is adapted to be engaged by the cross-head 13. The cross-head 13 is therefore connected at its respective ends to the bars 11 and 25, and both of these bars will be normally held out of the path of parts on the wheel by the spring 18, above alluded to. Each dog or latch 20 is provided with a laterally-projecting lug 26, and when the shaft 14 is turned to project the bar 25 toward the face of the disk or body portion 1 the forward end of said bar 25 will be disposed in the path of the lugs 26 of all the dogs or latches. The parts being in these positions as the wheel rotates the lugs 26 will successively strike the bar 25 and be moved out of contact with the plates or flanges 6 of the sprocketed sections, whereby the latter will be made to assume their normal position by the tension on the drive-chain, and the wheel will thus be made to assume its smallest size.

Instead of depending upon the tension of the drive-chain to collapse the wheel, springs attached at their respective ends to the sprocketed sections and the disk or body portion of the wheel may be employed.

The drive-chain 22 will be of such length as to be normally adaptable for the driving-wheel when the latter is expanded to its full size. It is therefore desirable that some means be provided for taking up the slack of the drive-chain when the driving-wheel is contracted to its smallest size. For this purpose a sprocket-wheel 27, of rubber or other soft material, adapted to bear on the under portion of the drive-chain, will be mounted at the lower end of a sliding bar 28, said sliding bar being mounted in a bracket 29, secured to the rear bar 30 of the bicycle-frame.

The slide 28 may be permitted to fall by gravity or by means of a spring, and will be retained in its depressed position, with the rubber wheel 27 against the drive-chain, by means of a dog 31, which latter is adapted to engage teeth 32 on the slide. The dog 31 is pivoted at its upper end, and below its upper end a rod or wire 33 is attached, the other end of said rod or wire being attached to an arm 34, projecting from the operating-shaft 14.

From this construction and arrangement of parts it will be seen that when the shaft 14 is operated for the purpose of increasing the size of the driving sprocket-wheel motion will at the same time be transmitted to the dog 32 through the medium of the wire 33 and arm 34, and said dog will be moved out of engagement with the teeth on the slide 28, whereupon the latter will be permitted to rise as the chain tightens.

Instead of providing the driving-sprocket with three pivoted sections it may be provided with four sections, as shown in Fig. 8, and the same devices will be employed for operating the sections. With the three-section wheel three speeds may be had, and with the four-section wheel four speeds may be had.

The driving sprocket-wheel might be made with two sections, as shown in Fig. 9. With this form an additional dog or catch 35 may be employed for holding the sections at the inner ends of their movements, said catch being so constructed and arranged as to automatically engage a lug 36 on the plate 6 of each section and so that the roller on the bar 11 will move it out of engagement with said lug 36.

My improvements are comparatively simple in construction and are effectual in all respects in the performance of their functions.

Various slight changes might be made in the details of construction of my invention without departing from the spirit thereof or limiting its scope, and hence I do not wish to limit myself to the precise details herein set forth; but, Having fully described my invention, what I claim as new, and desire to secure by Letters Patent, is—

1. A wheel comprising a disk or body portion and a series of sections composing the periphery of the wheel, each section having several teeth and being pivoted at one end to said disk or body portion, substantially as set forth.

2. A wheel comprising a disk or body portion, a series of sections composing the periphery of the wheel, each section having several teeth and being pivoted at one end to the disk or body portion, and means for locking said sections in their distended positions, substantially as set forth.

3. The combination with a disk or body portion and a series of sections composing the periphery of a wheel, each section having several teeth and being pivoted at one end to said disk or body portion, means for moving the free ends of said sections outwardly and means for locking the sections when thus moved, substantially as set forth.

4. The combination with a disk or body portion, of a series of sections constituting the periphery of a wheel, each section having several teeth and being pivotally connected at one end to said disk or body portion, a plate or flange projecting from the free end of each section and having an elongated slot and pins or screws secured to the disk or body portion and projecting through the slots in said plates or flanges, substantially as set forth.

5. The combination with a disk or body portion, of a series of sections constituting the periphery of a wheel, each section having several teeth and being pivotally connected at one end to the disk or body portion, a lateral flange on each section and normally disposed in an inclined position, and a device adapted to be moved into the path of said lateral flanges whereby to cause the free ends of the sections to be moved outwardly, substantially as set forth.

6. The combination with a wheel comprising a body portion and a sectional periphery, each section having several teeth and being pivoted at one end to the disk or body portion, of a plate projecting from the free end of each section, a lateral inclined flange projecting from each plate and a bar adapted to be moved into the path of said lateral inclined flanges whereby to cause the free ends of the sections to be moved outwardly, substantially as set forth.

7. The combination with a wheel comprising a disk or body portion and a sectional periphery, each section having several teeth and being pivoted at one end to the disk or body portion, of inclined lateral flanges on said sections, an operating-shaft, an arm or cross-head on said operating-shaft, and a movable bar connected with said arm or cross-head, whereby when the operating-shaft is turned said bar will be projected into the path of said lateral flanges on the sections, substantially as and for the purpose set forth.

8. The combination with a frame and a driving-wheel mounted thereon, said driving-wheel comprising a disk or body portion and a series of peripheral sections pivoted at one end to said disk or body portion, of a lateral inclined flange on each section, an operating-shaft, a handle attached to said shaft, a spring for maintaining the shaft in a normal position, a cross-head or arm at the end of said operating-shaft and a bar connected with said cross-head or arm, whereby when the operating-shaft is turned the bar will be projected into the path of the lateral inclined flanges, substantially as and for the purpose set forth.

9. The combination with a frame and a driving-wheel mounted thereon, said wheel comprising a disk or body portion and a series of peripheral sections pivoted at one end to said disk or body portion, of a plate or projection at the free end of each section, means for moving the free ends of the sections outwardly, spring-actuated catches for locking the sections in their outward positions, a lateral lug on each catch, a shaft mounted in bearings on the frame, a handle attached to said shaft, an arm at the other end of said shaft and a bar attached to said arm, whereby when the shaft is turned the bar will be projected into the path of the lugs on the catches whereby to move said catches to release the pivoted peripheral sections, substantially as set forth.

10. The combination with a frame and a driving-wheel mounted thereon, said wheel comprising a disk or body portion and a series of peripheral sections pivoted at one end to said disk or body portion, of a projection at the free end of each section, a flange on each projection, pivoted, spring-actuated catches to engage said projections when the free ends of the sections shall have been moved outwardly, a lug on each catch, an operating-shaft, a handle attached to one end of said shaft, a cross-head at the other end of said shaft, two bars connected respectively with the ends of said cross-head and a spring for maintaining said bars laterally removed from the face of the driving-wheel, one of said bars being adapted, when the shaft is moved in one direction to be disposed in the path of the flanges on the sections of the wheel and the other bar being, when the shaft is turned in the other direction, disposed in the path of the lugs on the catches, substantially as set forth.

11. In a bicycle, the combination with a frame, the rear sprocket-wheel, an expansible driving sprocket-wheel and a drive-chain passing over said sprocket-wheels, of a bracket secured to the rear portion of the frame, a vertically-sliding bar in said bracket, a wheel of soft material mounted at the lower end of said sliding bar and adapted to bear against the drive-chain, teeth in said sliding bar and a pivoted dog to engage said teeth whereby to retain said wheel against the drive-chain, substantially as and for the purpose set forth.

In testimony whereof I have signed this specification in the presence of two subscribing witnesses.

HENRY R. VAN EYCK.

Witnesses:
R. J. TEN HAVE,
JACOB VAN EYCK.